(12) United States Patent
Kong

(10) Patent No.: US 9,503,712 B2
(45) Date of Patent: Nov. 22, 2016

(54) THREE DIMENSIONAL DISPLAY SYSTEM

(71) Applicant: Liang Kong, Wukang (CN)

(72) Inventor: Liang Kong, Wukang (CN)

( * ) Notice: Subject to any disclaimer, the term of this patent is extended or adjusted under 35 U.S.C. 154(b) by 0 days.

(21) Appl. No.: 14/359,925

(22) PCT Filed: Dec. 18, 2012

(86) PCT No.: PCT/CN2012/086885
§ 371 (c)(1),
(2) Date: May 22, 2014

(87) PCT Pub. No.: WO2013/102398
PCT Pub. Date: Jul. 11, 2013

(65) Prior Publication Data
US 2014/0327747 A1    Nov. 6, 2014

(30) Foreign Application Priority Data

Jan. 3, 2012 (GB) .................................. 1200012.1
Feb. 9, 2012 (GB) .................................. 1202286.9
Jun. 29, 2012 (GB) .................................. 1211542.4

(51) Int. Cl.
| | |
|---|---|
| *H04N 13/04* | (2006.01) |
| *H04N 13/02* | (2006.01) |
| *H04N 9/31* | (2006.01) |
| *G02B 27/22* | (2006.01) |

(Continued)

(52) U.S. Cl.
CPC ...... *H04N 13/0459* (2013.01); *G02B 27/2292* (2013.01); *G06F 3/017* (2013.01); *G06F 3/04815* (2013.01); *H04N 9/3147* (2013.01); *H04N 9/3194* (2013.01); *H04N 13/0207* (2013.01); *H04N 13/0445* (2013.01); *H04N 13/0468* (2013.01)

(58) Field of Classification Search
CPC .......... G02B 27/2292; G02B 27/2214; G02B 27/22; H04N 9/3147; H04N 9/3194; H04N 13/0468; H04N 13/0207; H04N 13/0445; H04N 13/0459; H04N 13/0497; H04N 13/0404; H04N 13/0409; H04N 13/0422; G06F 3/017; G06F 3/04815; G03B 21/608; G03B 35/20; G03B 21/60; G06T 15/00; G09G 5/00
See application file for complete search history.

(56) References Cited

U.S. PATENT DOCUMENTS 3,390,607 A * 7/1968 Wills .............................. 353/21
6,323,984 B1 * 11/2001 Trisnadi ....................... 359/245

(Continued)

FOREIGN PATENT DOCUMENTS

| CN | 1989773 | 6/2007 |
|---|---|---|
| CN | 101013302 | 8/2007 |

(Continued)

*Primary Examiner* — Mohammed Jebari
(74) *Attorney, Agent, or Firm* — Taylor English Duma LLP

(57) ABSTRACT

A three-dimensional display system (10) comprises a display housing (24) and a plurality of projectors (12) for projecting two-dimensional images (102) into a space, each projector (12) having means to adjust the distance between the projector (12) and the projected image (102), and each projector (12) being pivotally mounted to the display housing (24), for adjusting the horizontal and vertical position of the projected two-dimensional image (102) with respect to the projector (12). The display provides a high-resolution, three-dimensional multi-colored image which can be touched safely by the viewer. The display may be respond to physical objects in the display area by altering the image. The display may be used to operate a computer and browse the world wide web.

18 Claims, 16 Drawing Sheets

(51) Int. Cl.
*G06F 3/0481* (2013.01)
*G06F 3/01* (2006.01)

(56) References Cited

U.S. PATENT DOCUMENTS

| | | |
|---|---|---|
| 7,744,216 B1 | 6/2010 | Uhlhorn |
| 2001/0026247 A1* | 10/2001 | Nishio et al. ................ 345/4 |
| 2004/0001182 A1* | 1/2004 | Dyner ........................ 353/28 |
| 2004/0080820 A1* | 4/2004 | Palovuori et al. ........... 359/443 |
| 2005/0219240 A1* | 10/2005 | Vesely ............... G06F 3/0304 345/419 |
| 2006/0012675 A1 | 1/2006 | Alpaslan et al. |
| 2006/0171008 A1* | 8/2006 | Mintz ............... G02B 27/2285 359/15 |
| 2007/0104473 A1* | 5/2007 | Lee et al. ................... 396/79 |
| 2007/0247595 A1 | 10/2007 | Refai et al. |
| 2008/0021586 A1* | 1/2008 | Schillen et al. ............. 700/120 |
| 2009/0006938 A1* | 1/2009 | Yoo et al. ................... 715/205 |
| 2009/0009593 A1* | 1/2009 | Cameron .......... H04N 13/0459 348/51 |
| 2011/0128555 A1* | 6/2011 | Rotschild ........... G02B 27/2271 356/625 |
| 2011/0164032 A1* | 7/2011 | Shadmi ................. G06F 3/017 345/419 |
| 2011/0285964 A1* | 11/2011 | Reichow ...................... 353/10 |
| 2012/0044460 A1* | 2/2012 | Refai et al. .................. 353/10 |
| 2012/0293632 A1* | 11/2012 | Yukich ............... H04N 13/0493 348/47 |
| 2012/0314021 A1* | 12/2012 | Tsang ..................... G03H 1/02 348/40 |
| 2013/0044108 A1* | 2/2013 | Tanaka ................. G06T 15/04 345/419 |
| 2013/0271800 A1* | 10/2013 | Kanugo ............... G03H 1/2294 359/9 |

FOREIGN PATENT DOCUMENTS

| | | |
|---|---|---|
| CN | 102169283 | 8/2011 |
| CN | 102262301 | 11/2011 |
| GB | 2422500 | 7/2006 |
| GB | 2479522 | 10/2011 |
| WO | WO 2008132724 | 11/2008 |
| WO | WO 2010142737 | 12/2010 |

* cited by examiner

THREE DIMENSIONAL DISPLAY SYSTEM

The present invention relates to a three-dimensional display and particularly but not exclusively to a three-dimensional display allowing user interaction.

BACKGROUND TO THE INVENTION

Three-dimensional display systems are well known and fall into several technical categories. Stereoscopic systems rely on presenting two different images to the two eyes of a viewer. This may be achieved by projecting two images onto the same screen, and providing a viewer with polarized glasses or glasses with coloured filters so that a first image is seen only by the viewer's right eye, and a second image is seen only by the viewer's left eye. Autostereoscopic systems, which do not require glasses, are also available and present separate images to each eye via a parallax barrier or lenticular array.

In stereoscopic systems, the images which are presented to the left and right eyes of the viewer are the same images, whatever the position of the viewer with respect to the image. The viewer cannot therefore see around the sides or back of the image, but is simply presented with a single perspective view, with the illusion of depth. Eye tracking devices have been used to follow the gaze of a viewer, and adjust the image in real time. However, such systems are suitable only for viewing by a single viewer.

Volumetric displays are also known, and include 'swept-volume' devices. Such displays rapidly project slices of a three dimensional image onto a moving two dimensional surface, relying on persistence of vision in order to present a three dimensional image to a viewer. However, since the display volume in such devices must include a rapidly moving mechanical part, use of a swept-volume display as an interactive device is impossible, since the image cannot be touched without causing injury. These displays are also unsuitable for use in mobile devices such as laptops, tablets and phones.

'Static-volume' devices are also known, and avoid the need for moving parts in the display volume. An example static-volume display device focuses a laser on a point in air, where it ionises the air at that point, creating a ball of plasma. Such displays do not require moving parts in the display volume, but the displayed image is made up of relatively large pixels, so the display resolution is low. The display is also limited to a single colour, or small number of colours.

Three-dimensional images can also be produced by holography. However, known holographic displays do not offer user interaction.

Many of the above mentioned existing types of three-dimensional display produce a virtual image, or an image which is confined within the display. A virtual, as opposed to real, image cannot be touched and therefore cannot offer user interaction.

It is an object of this invention to provide a three-dimensional interactive display which reduces or substantially obviates the above mentioned problems.

STATEMENT OF INVENTION

According to a first aspect of the present invention, a three-dimensional display system comprises a display housing and a plurality of projectors for projecting two-dimensional images into free space, each projector having means to adjust the distance of the projected image from the projector, and each projector being pivotally mounted to the display housing, for adjusting the horizontal and vertical position of the projected two-dimensional image with respect to the projector.

By providing a plurality of projectors, a three-dimensional image may be built up from multiple two-dimensional image components. This provides a three dimensional image which can be viewed from many angles as if a real object. It is advantageous to build the image from small image components, since each image component has a small field of view, and thus will be subject to minimal optical aberration.

Ideally, the small image components will merge together to form a single three-dimensional image. However, a compelling three-dimensional effect may be obtained even when the two-dimensional images are slightly separated, and it may on occasion be desired to create multiple disjoint three-dimensional images.

By providing projectors with an adjustable throw, and pivotally mounting the projectors in the housing, the position of each two dimensional image component may be varied. Thus many different three dimensional images may be displayed, and moving images may be produced. No moving parts are present in the display volume, so the projected image may safely be touched. The image may be high-resolution and multicoloured, and no special equipment is needed to view the image. Multiple viewers may enjoy the display at one time.

Each projector may include a light source, a display screen and a zoom lens. Each projector may also include a wavefront modulator. The projector with light source, display screen and zoom lens operates in a conventional manner to project the image on the display screen, focused to a point determined by adjustment of the zoom lens and, where provided, the modulator.

The zoom lens may be a liquid zoom lens. A liquid zoom is especially advantages where the display device is for mobile use, since substantial space savings can be achieved compared with traditional mechanical zoom lenses.

Each projector may further include a projector housing, which may take the shape of an elongate square prism. Such a shape is advantageous since many such projectors may be efficiently mounted onto a frame.

Each projector may alternatively include a housing taking the shape of a frustum of a cone, the display screen being disposed near the narrow end of the housing and the zoom lens being disposed near the wide end. Such a shape is advantageous since minimal light it absorbed by the walls of the housing, resulting in efficient operation.

At least one camera may be provided, which may be connected to a computer having image-processing software. The camera may be trained on the display volume of the display device, to detect the presence and position of real objects in relation to the projected image.

Where a camera and computer are provided, a numeral or other symbol may form part of each projected two-dimensional image component, and the image-processing software may be configured to detect the presence or absence of the numerals or other symbols from the video signal or signals from the camera or cameras. In this way, the computer is able to identify which if any parts of the projected image have been scattered by the presence of some physical obstruction, for example a user's hand.

The numerals may be projected in a part of the electromagnetic spectrum which is invisible to the human eye, for example ultraviolet or infrared.

According to a second aspect of the invention, a method of operating a computer comprises the steps of:
(a) providing a three-dimensional display system comprising a display housing and a plurality of projectors for projecting two-dimensional images into free space, each projector having means to adjust the distance of the projected image from the projector, and each projector being pivotally mounted to the display housing, for adjusting the horizontal and vertical position of the projected two-dimensional image with respect to the projector;
(b) displaying a three dimensional object on the three-dimensional display;
(c) displaying symbols relating to programs, functions, data or devices on the surface of the object;
(d) detecting the presence and position of a user's hand or other appendage adjacent to the surface of the object; and
(e) depending on the symbol which is displayed close to the point where the user's hand is detected, launching the program, activating the function, loading the data or activating functions relating to the device represented by that symbol.

The method of operating a computer may further comprise the steps of:
(f) reducing the size of the object displayed in step (a); and
(g) displaying a new object to represent the functions of the program launched, the elements of the data loaded, or the contents of the device represented by the symbol chosen by the user in step (c).

This method of operating a computer provides a highly visual human-computer interaction, the user being able to experience the benefit of three-dimensional space to hold a representation of, for example, the organization of the data he is viewing. This allows for far faster understanding of complex interconnected data and functions than with conventional two-dimensional interfaces.

According to a third aspect of the present invention, a method of browsing the world wide web comprises the steps of:
(a) providing a three-dimensional display system comprising a display housing and a plurality of projectors for projecting two-dimensional images into free space, each projector having means to adjust the distance of the projected image from the projector, and each projector being pivotally mounted to the display housing, for adjusting the horizontal and vertical position of the projected two-dimensional image with respect to the projector;
(b) displaying a first web page on the three-dimensional display;
(c) detecting the presence and position of a user's hand or other appendage adjacent to the displayed web page; and
(d) where the user's hand is detected close to a hyperlink on the first web page, reducing the size of the first web page and displaying at a larger size the web page which is the target of the hyperlink.

Like the method of the second aspect of the invention, this method provides the user with an increased awareness and understanding of the interconnected nature of the web pages he is visiting. Whilst viewing any particular page the user is aware not only of where he may go to from that page, but also where he came from to get there. In this way, non-linear browsing including back-tracking to previously visited sites becomes easier and information is more readily assimilated into the user's mind.

Web pages may be written in a markup language in which the three-dimensional position of each element is defined. Such web pages may therefore be optimised for a display and interaction method according to the third aspect of the present invention.

Alternatively, a three-dimensional style which defines the three-dimensional location of each page component may be applied to an HTML or XHTML webpage designed for display in a standard two-dimensional browser.

DESCRIPTION OF THE DRAWINGS

For a better understanding of the present invention, and to show more clearly how it may be carried into effect, reference will now be made by way of example only to the accompanying drawings, in which.

DESCRIPTION OF PREFERRED EMBODIMENT

Figure 1:
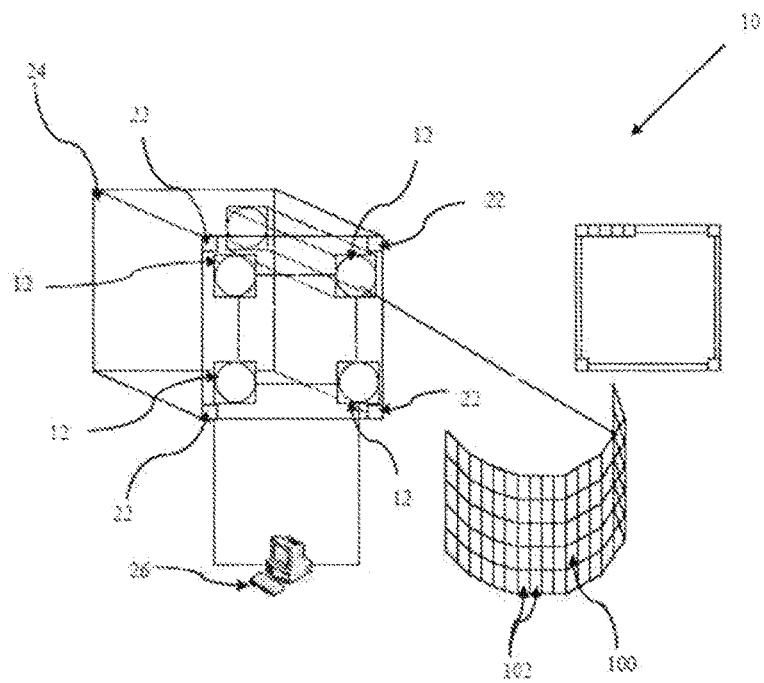
FIG. 1 shows a schematic perspective view of a three-dimensional display system according to the first aspect of the invention.

Referring firstly to FIG. 1, a three-dimensional display system is indicated generally at 10. The display system 10 comprises a plurality of projection blocks 12, a plurality of cameras 22, a display housing 24 and a computer 26. Each projection block 12 projects a two-dimensional image component 102 into the space in front of the display system 10. The two-dimensional image components 102 combine to form a three-dimensional image 100.

Figure 2:
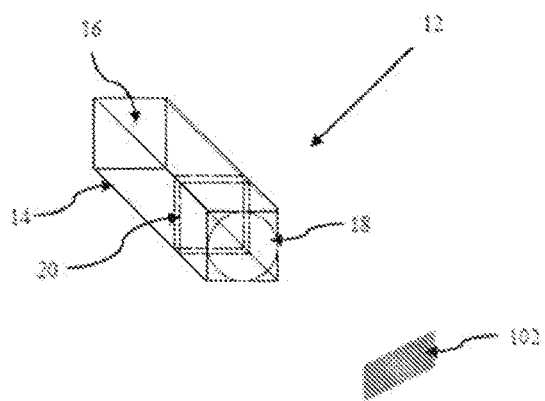
FIG. 2 shows a schematic perspective view of a projector, being a component part of the three-dimensional display system of FIG. 1.

The structure of each projection block 12 is illustrated in FIG. 2. Each projection block comprises a block housing 14, a two-dimensional display screen 16, a zoom lens 18 and a modulator 20. The housing 14 is in the shape of an elongate square prism. The two-dimensional display screen 16 is at one end of the elongate housing 14 and the zoom lens 18 is at the opposing end. The modulator 20 is disposed at substantially one quarter of the distance between the ends, closer to the zoom lens 18 than the display screen 16.

The two-dimensional display screen 16 is in this embodiment an LCD display controlled by the computer 26. The display screen 16 is backlit. In use, an image component is displayed on the display screen 16, and the zoom lens 18 and modulator 20 are adjusted to display a sharp image at a point in space which is a configurable distance from the projection block 12. The block housing 14 is made from a lightproof material so that light does not cross between projection blocks 12 mounted on the same frame, causing interference. The zoom lens 18 may be a liquid zoom lens, for example as disclosed in GB patent 2432010 (SAMSUNG).

Some aberration of the projected image component 102 may be introduced by the modulator 20 and/or the lens 18. Distortion is one type of aberration which may be introduced, and this may be predicted by the computer 26 and compensated by introducing a distortion in the opposite sense to the image which is sent to the two-dimensional display screen 16. Spherical aberration can also be corrected in this way, although in practice the spherical aberration is in many circumstances not noticeable to a viewer.

A haze machine (not shown) provides a cloud of suspended particles in the air, forming a semi-transparent fog. This allows the projection blocks 12 to project an image which floats in the air. The haze machine is preferably selected to produce a unobtrusive fog, which is invisible, or nearly invisible, to a viewer.

Figure 3:
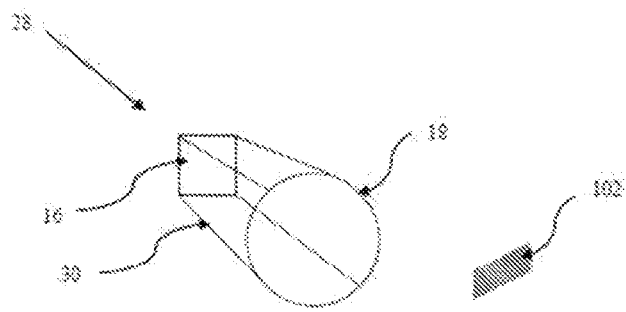
FIG. 3 shows an alternative embodiment of a projector, being an alternative to the projector of FIG. 2 in the display system of FIG. 1.

An alternative embodiment of a projection block 28 is shown in FIG. 3. In the alternative embodiment, the block housing 30 is in the shape of a frustum of a cone. In this embodiment, the two-dimensional display screen 16 is at the narrow end of the housing 30, and the zoom lens 18 is at the wide end.

Figure 6:
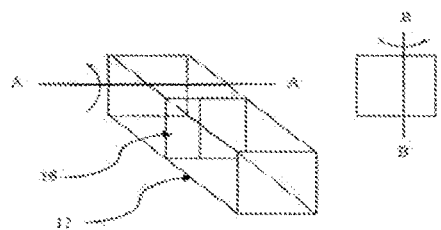
FIG. 6 illustrates the pivotal mounting of the projector of FIG. 2.
Figure 7:
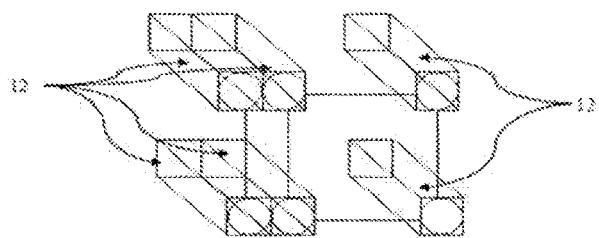
FIG. 7 shows an arrangement of multiple copies of the projector of FIG. 2 on a frame.
Figure 8:
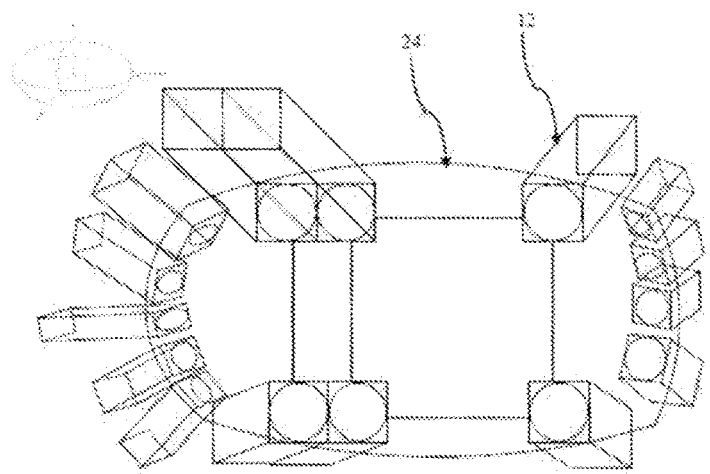
FIG. 8 shows an alternative arrangement of multiple copies of the projector of FIG. 2 on a frame.
Figure 9:
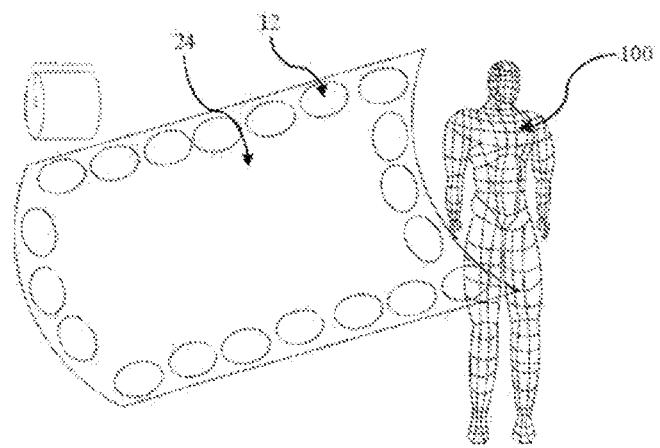
FIG. 9 shows a further alternative arrangement of multiple copies of the projector of FIG. 2 on a frame.

In either embodiment of projection block 12 or 28, the display screen 16 may, instead of being near an end of the block 12 or 28, be disposed at some distance from the end of the block 12 or 28, as shown in FIG. 6.

Figure 4:
FIG. 4 shows a comparison between the projector of FIG. 2 and the projector of FIG. 3.

The shape of the projection block 28 is advantageous since it ensures that a high proportion of the light from the backlit display screen 16 is projected out of the projector housing 30, rather than being absorbed by the lightproof walls, as illustrated in FIG. 4.

The projection blocks may alternatively be replaced by any other device capable of projecting a point, pixel or image component into a space. For example, lasers may be used to encourage visible radiation in a gas.

It is envisaged that some or all of the projection blocks may be of a construction capable of projecting a hologram, including a laser and photographic plate with a previously recorded hologram.

Figure 5:
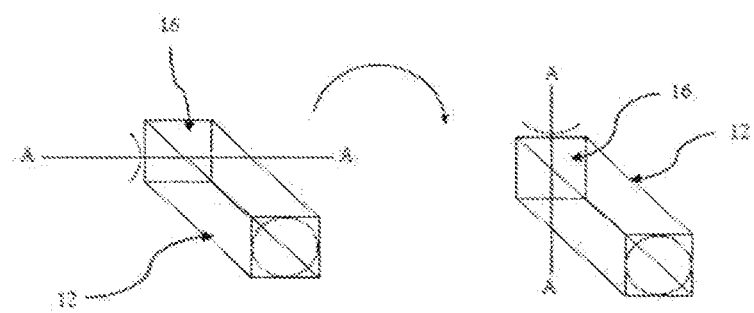
FIG. 5 illustrates the rotational mounting of the projector of FIG. 2.

Referring now to FIGS. 5 and 6, each projection block 12 or 28 is mounted to the display housing 24 so that it can pivot about either of two orthogonal axis A-A and B-B, which are at the end of the housing 12 or 28 in the same plane as the display screen 16, and each perpendicular to an edge of the display screen 16. Each projection block 12 or 28 may also be rotated through 90° about the major axis of the prism or frustum of the block housing. The mountings are motorised and are controlled by the computer 26 so that, in use, each projected image component 102 may be moved in a horizontal X direction parallel to the surface of the display system 10 by pivoting the projection block 12 or 28 about axis A-A, in a vertical Y direction parallel to the surface of the display system 10 by pivoting the projection block 12 or 28 about axis B-B, and in a Z direction perpendicular to the surface of the display system 10 by adjusting the zoom lens 18 and modulator 20. Rotation of the housing is advantageous since it provides additional flexibility in terms of the arrangement of the image components 102 for form the three dimensional image 100.

In this embodiment, the display screen 16 is square. However, display screens of other shapes may be used, and where this is the case a 90° rotation provides a different aspect ratio in the two-dimensional image component 102.

Figure 10:
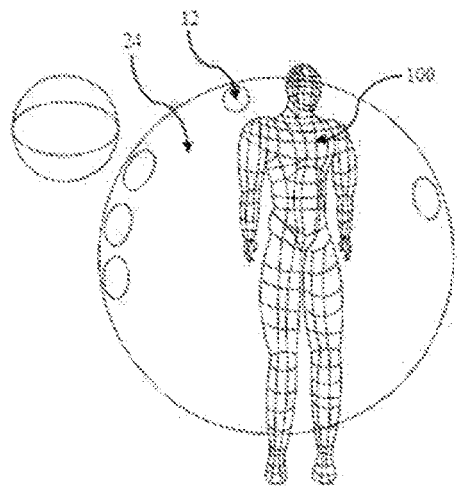
FIG. 10 shows a further alternative arrangement of multiple copies of the projector of FIG. 2 on a frame.
Figure 11:
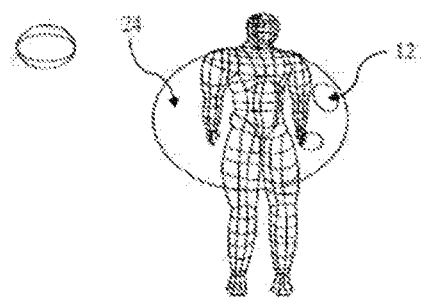
FIG. 11 shows a further alternative arrangement of multiple copies of the projector of FIG. 2 on a frame.
Figure 12:
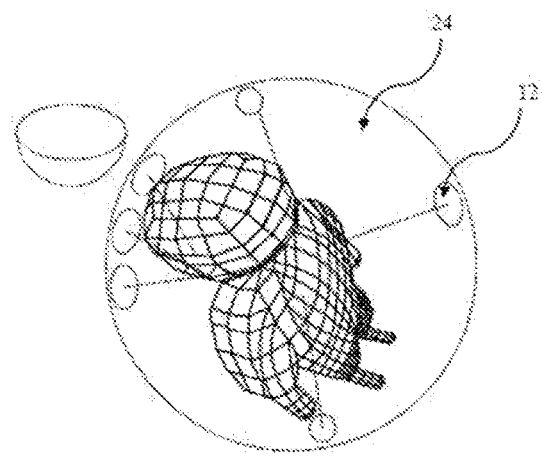
FIG. 12 shows a further alternative arrangement of multiple copies of the projector of FIG. 2 on a frame.

Different arrangements of projection blocks 12 or 28 within display housings 24 are shown in FIGS. 7 to 12. The arrangement of projection blocks 12 or 28 may be selected to best suit the shape of image intended to be shown on the display. For example, FIG. 10 shows a spherical arrangement of projection blocks, in which the projection blocks 12 or 28 point outwards from the display, so that the three-dimensional image 100 may completely surround the display. The three-dimensional image 100 may be, for example, a panoramic landscape, and may be viewed by multiple viewers who move around, above and below the display device 10. FIG. 12 shows a hemispherical arrangement which is suitable for use in a mobile device such as a laptop, tablet, or mobile phone.

Figure 13:
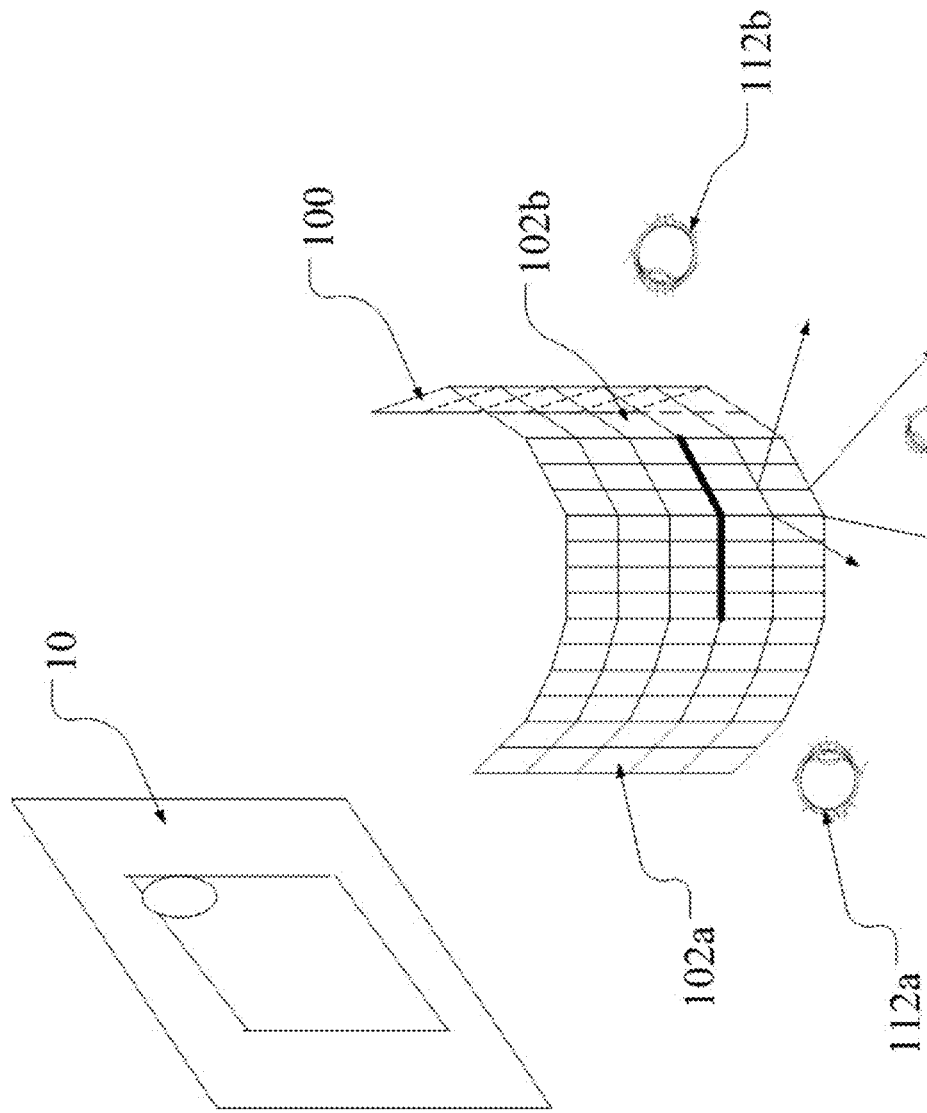
FIG. 13 shows the display device of FIG. 1, in use, with multiple viewing perspectives indicated.

In use, as shown in FIG. 13, a three-dimensional image 100 is projected by the display device 10 made up of multiple image components 102. Depending on the position of the viewer 112, some image components 102 will be within the viewer's field of view, but others cannot be seen. This is consistent with the viewer's experience of real three dimensional objects: only parts which are not obscured by other parts may be seen. In FIG. 13, viewer 112a can see image component 102a, but cannot see image component 102b. Likewise, viewer 112b can see image component 102b, but cannot see image component 102a. Each image component may be viewed by an observer within a particular range of angles, and is invisible to an observer outside of that angular range.

Figure 14:
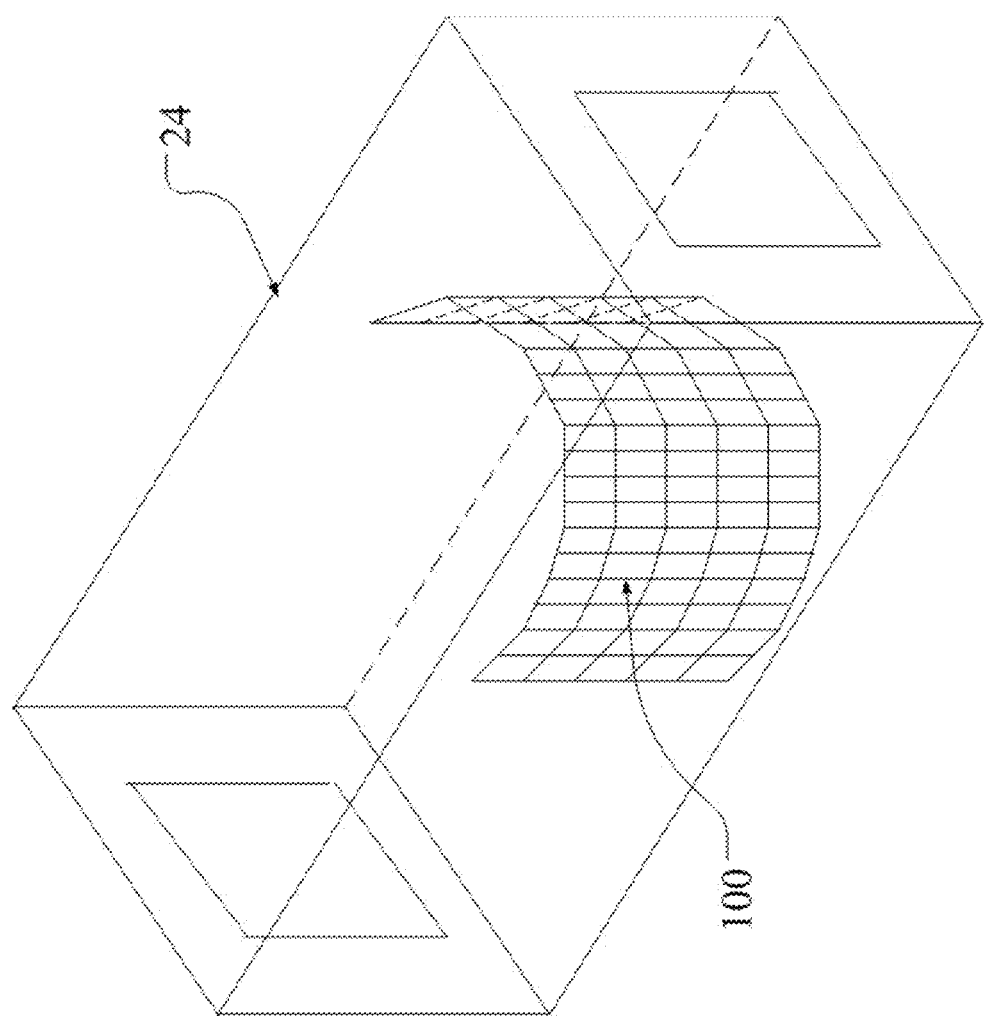
FIG. 14 shows the display device of FIG. 1, in which the projected three-dimensional image is contained within the housing.
Figure 15:
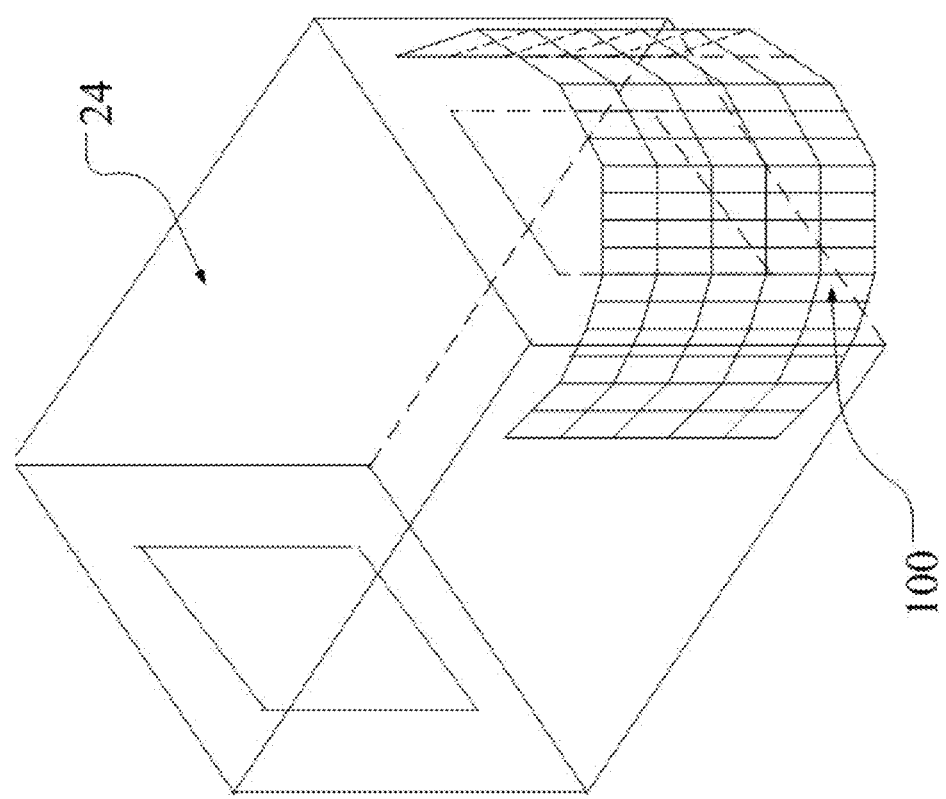
FIG. 15 shows the display device of FIG. 1, in which the projected three-dimensional image is partially contained within the housing.
Figure 16:
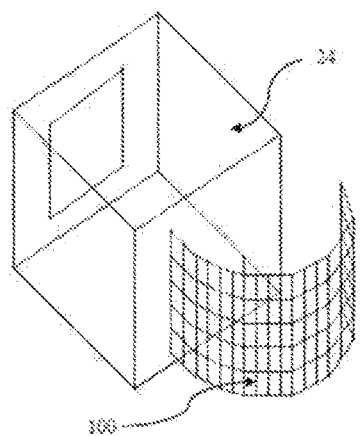
FIG. 16 shows the display device of FIG. 1, in which the projected three-dimensional image is wholly without the housing.

The projected three-dimensional image may be within the boundaries of the display housing 24, as shown in FIG. 14, or alternatively may be wholly or partly beyond the boundaries of the housing 24, as shown in FIGS. 15 and 16.

Figure 17:
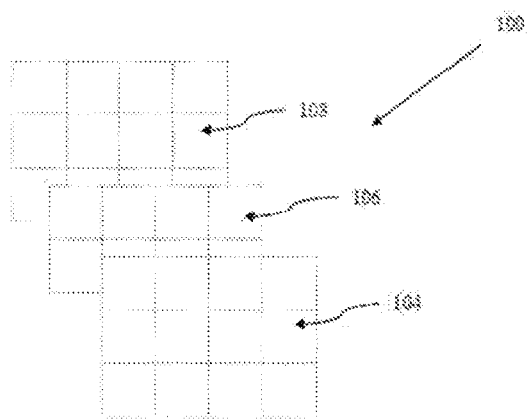
FIG. 17 shows an image projected by the display device of FIG. 1, formed of a background portion, a mid-ground portion and a foreground portion.

FIG. 17 illustrates a three-dimensional image 100 built up from a two-dimensional foreground 104, mid-ground 106 and background 108. The foreground 104 occludes the parts of the mid-ground 106 and background 108 which it covers. However, by moving his position, a viewer may see over or around the foreground, to previously obscured parts of the background 108 and mid-ground 106.

The three dimensional image 100 is able to respond to the presence of physical objects, allowing a user to interact with the image 100 on the three-dimensional display 10.

Figure 18:
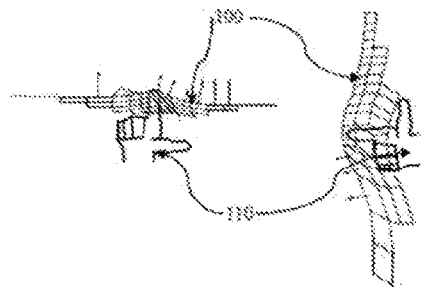
FIG. 18 shows an image of a pliant sheet projected by the display device of FIG. 1, which is being touched by a real person.
Figure 19:
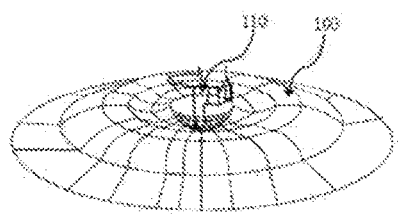
FIG. 19 shows an image of the surface of a body of fluid projected by the display device of FIG. 1, which is being touched by a real person.
Figure 20:
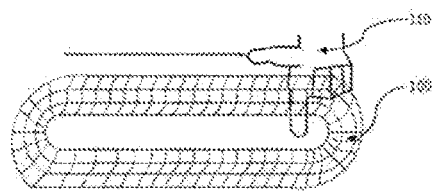
FIG. 20 shows an image of the surface of a soft body projected by the display device of FIG. 1, which is being touched by a real person.

FIGS. 18 to 20 show a number of example interactions. In FIG. 18, the projected image 100 is of a pliant sheet. The three-dimensional image 100 is seen to respond to the user's touch as a physical pliant sheet would. In FIG. 19, the projected image 100 is of the surface of a body of fluid. When the user's hand 110 meets the image, a wave or ripple is seen to move outwardly from the point of contact. In FIG. 20, the projected image 100 is of the surface of a soft and non-resilient material, for example a body of sand. When the user's hand 110 meets the surface of the projected image, a trough is made in the surface which remains after the hand 110 is moved away. In the figure, the hand 110 has been moved horizontally from the left to the right of the image, creating a linear trough.

Figure 21:
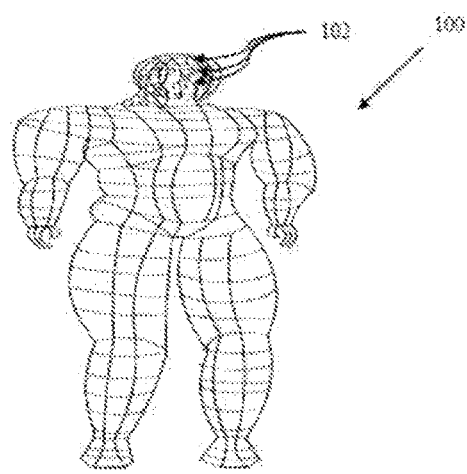
FIG. 21 shows an image of a humanoid being projected by the display device of FIG. 1.

Three dimensional interactions, not limited to those examples described above and shown in FIGS. 18 to 20, can be realised by making use of the cameras 22. The cameras 22 are trained on the area in which the image 100 is being projected. Each image component 102 is marked with a numeral, as seen in FIG. 21. The numerals may be small so as to be unobstrusive and nearly invisible to the user. The numerals may be projected in an invisible portion of the electromagnetic spectrum, for example ultraviolet or infrared. The computer 26 receives video signals from the cameras 22 and is able to identify when an image component 102 has been scattered by the presence of an object, due to the numeral in that image component 102 no longer being visible. In this way, the position of an external object can be discerned and the projected three dimensional image 100 made to react appropriately by adjustment of the video signals sent to the display screens 16, of the zoom lens 18 and modulator 20 of the projection blocks 12, and of the angular position of the projection blocks 12 on the motorised mountings.

Alternatively, the computer 26 may be provided with image processing software which is able to detect the position and motion of objects within the field of view of the cameras 22. This method is advantageous since it does not necessitate obscuring the projected image 100 with numerals. Suitable image processing techniques are described in Dellaert et al. (2000), *Structure from Motion without Correspondence*, IEEE Computer Society Conference on Computer Vision and Pattern Recognition, and in Hartley and Zisserman (2004), *Multiple View Geometry in Computer Vision*, Cambridge University Press. Lasers, radar, or similar technologies which are able to detect the position of an object in space may also be used to the same effect.

The cameras 22 may also be used to record a moving person or object. The video streams from the cameras 22 may be used by the computer 26 to build a three-dimensional model of the scene using known techniques. The three-dimensional model may later be played back via the three-dimensional display device 10. The recording may be stored and may be transmitted to another person via, for example, email.

Figure 22:
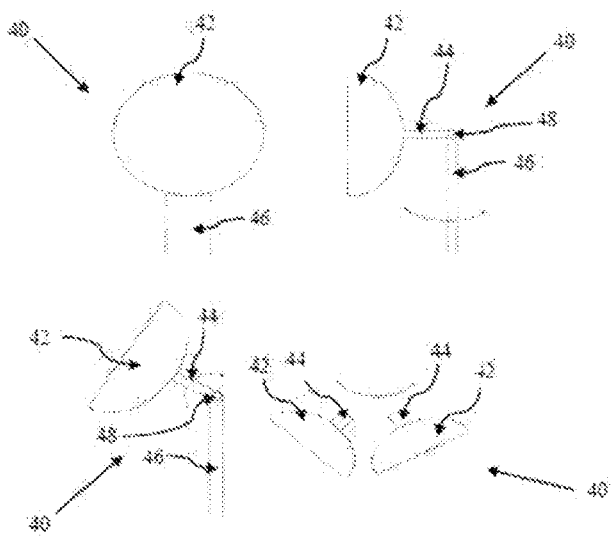
FIG. 22 shows a concave mirror on a moveable mount.

In FIG. 22, a concave mirror unit 40 is indicated generally at 40. The mirror unit 40 comprises a concave mirror 42, a first support member 44 secured to the centre of the outer surface of the concave mirror and extending perpendicular to the tangent of the curved surface at that point, and a second support member 46 pivotally joined to the first support member. The second support member 46 is, in use, securely attached to, for example, a floor or wall. A motorised mounting 48 is provided where the first support member 44 is joined to the second support member, and allows rotation of the mirror 42 about three orthogonal axes. The motorised mounting is controlled by the computer 26, in order to adjust the position of the concave mirror.

Figure 23:
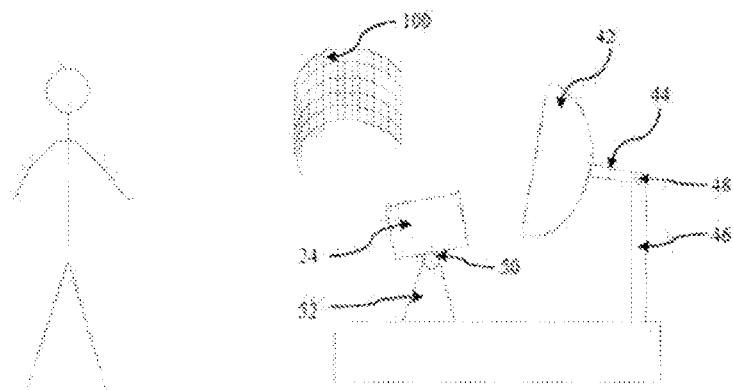
FIG. 23 shows the three dimensional display system of FIG. 1 used in conjunction with the concave mirror of FIG. 22.

As shown in FIG. 23, the movable concave mirror unit 40 allows the three-dimensional image 100 projected by the display device 10 to be reflected, and hence moved in its entirety to a different position. The position of the three-dimensional image can be controlled by the computer by controlling the motorised mounting 48. A second motorised mounting 50 is also provided to support the three dimensional display housing 24 on a support truss 52. The second motorised mounting 50 provides similar freedom of motion as the first motorised mounting 48, is controlled by the computer, and provides further flexibility in positioning the projected image 100.

Figure 24:
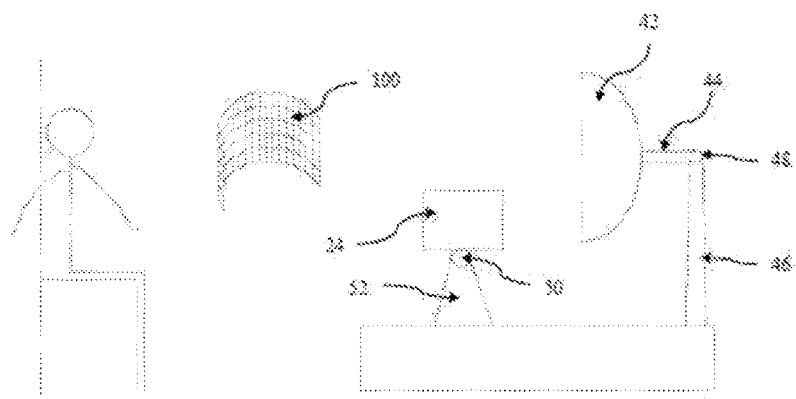
FIG. 24 shows the arrangement of FIG. 23 in a different position.
Figure 25:
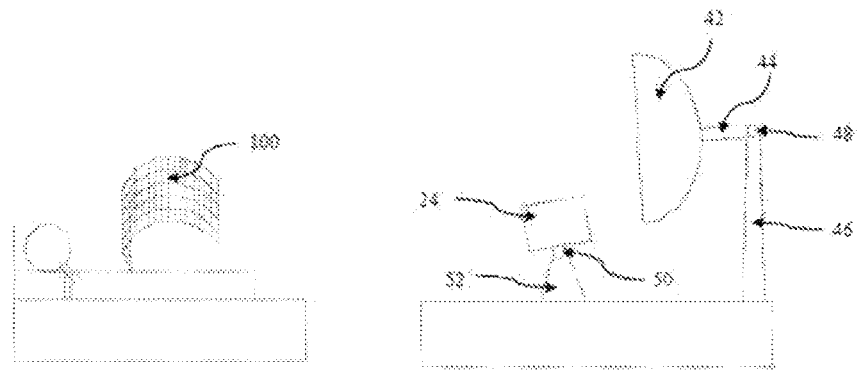
FIG. 25 shows the arrangement of FIG. 24 in yet a further position.

The adjustable image position allows the three dimensional image 100 to be observed by a standing, sitting or lying viewer, as shown in FIGS. 23 to 25. The image position may be adjusted manually by the user, for example via a remote control. Alternatively, the image position may be adjusted automatically by the computer 26, which takes input from cameras 22 in order to track the position of the user's head.

Figure 26:
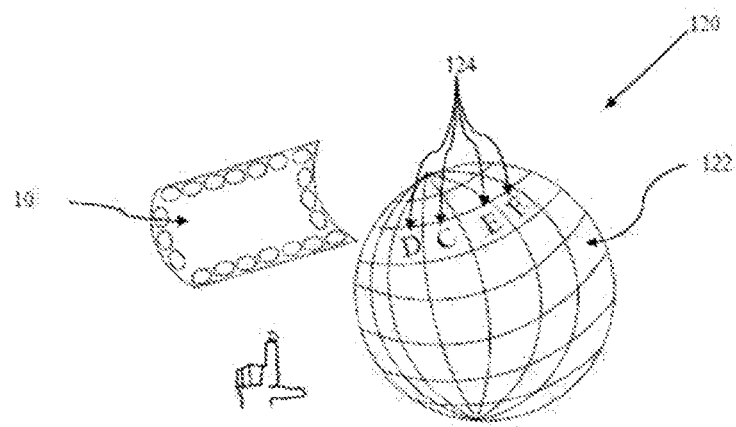
FIG. 26 shows a computer operating interface according to the second aspect of the invention.
Figure 27:
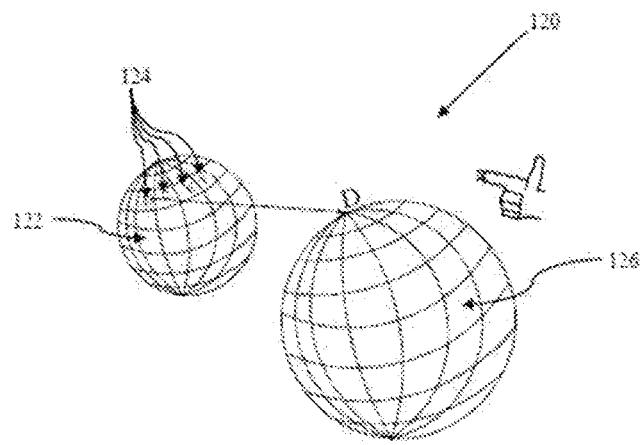
FIG. 27 shows the interface of FIG. 26, after part of the image of FIG. 26 has been touched by a user's hand.
Figure 28:
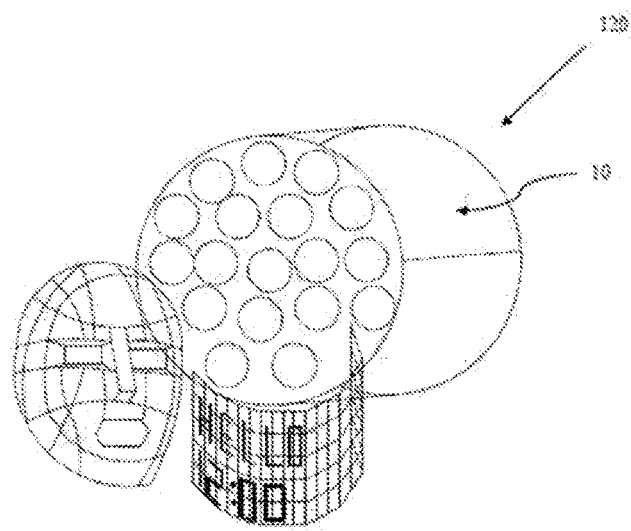
FIG. 28 shows an email message display which is part of the interface of FIG. 26.

The three dimensional display system 10 may be used to operate a computer, as shown in FIGS. 22 to 24. In FIG. 26, a three dimensional computing interface 120 comprises a projected image of a first three dimensional sphere 122, which is projected by the three dimensional display system 10. Different storage devices connected to the computer are represented by letters or symbols 124 on the surface of the first sphere 122. Programs or data files may also be represented by similar letters or symbols. When a user touches the appropriate symbol, which may be detected by any one of the above mentioned methods, the size of the first sphere 122 is reduced and a second sphere 126 is projected to represent for example the files or directories in the selected storage device, the functions of the selected program, or the data in the selected data file, as shown in FIG. 27. Several programs, directories or files may be open at any particular time, and each is represented by its own sphere, smaller spheres representing background tasks which are not currently enjoying user interaction. It will be understood that shapes other than spheres may equally be used to represent devices, programs and data within a computer system. In FIG. 28, an email message is received and is shown on the three dimensional display 10, together with a three dimensional image of the sender.

Figure 29:
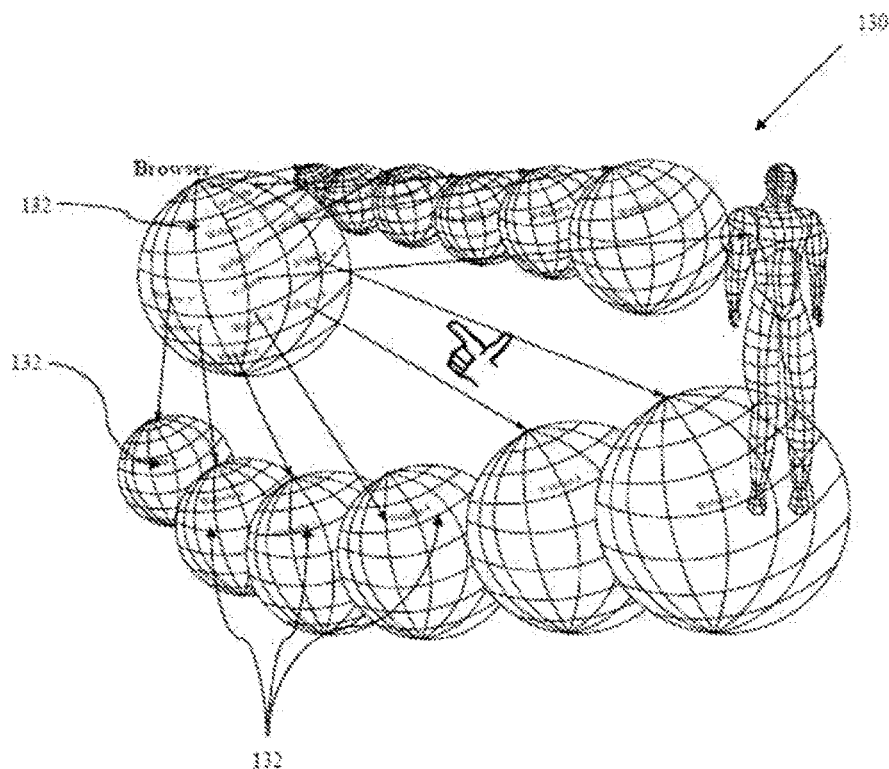
FIG. 29 shows a web browser according to the third aspect of the invention.
Figure 30:
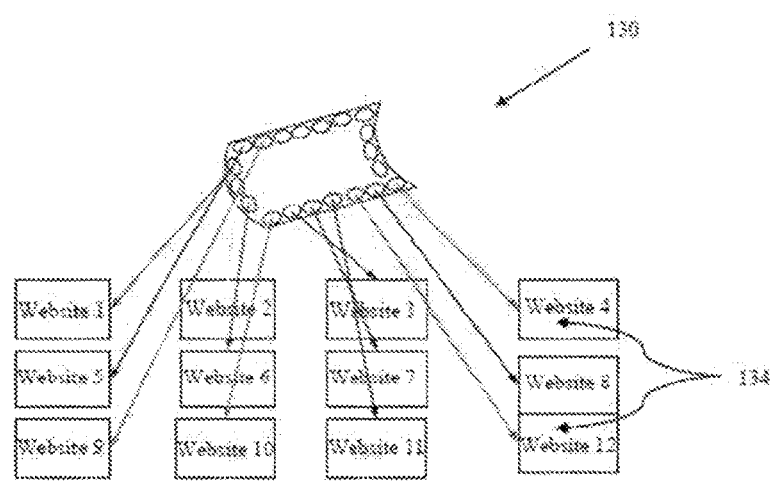
FIG. 30 shows the web browser of FIG. 29, where legacy two-dimensional websites are being displayed.

FIGS. 29 and 30 show a three dimensional web browser 130. Similar to the three dimensional computing interface 120, web pages 132 are represented by the browser 130 as spheres. When a user touches a part of the surface of a first sphere which is marked to represent a link to another website, the size of the first sphere is reduced and a second sphere of large size appears to represent the linked page. Web pages 132 may be specifically designed for three-dimensional display, in a markup language which specifies the three dimensional position of each component. Alternatively, three dimensional styles may be locally applied to traditional two dimensional HTML or XHTML web pages. The browser may show several web pages concurrently. For compatibility, the web browser 130 is also able to display two dimensional web pages 134 without adding a three-dimensional style definition. Three-dimensional videos may be embedded into web pages.

Figure 31:
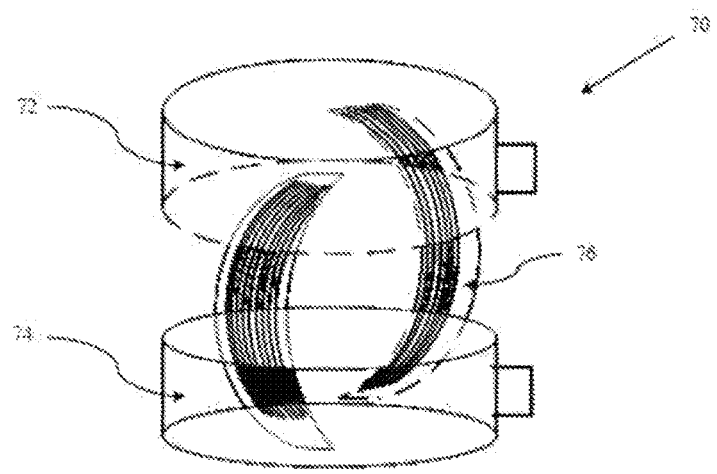
FIG. 31 shows a double-faced watch according to the fourth aspect of the invention.
Figure 32:
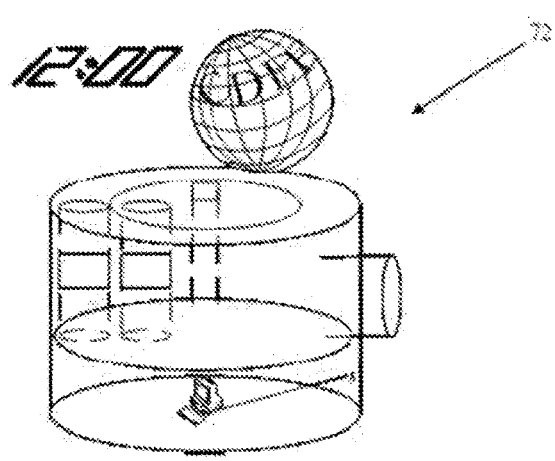
FIG. 32 shows one face of the watch of FIG. 31.

Referring now to FIGS. 31 and 32, a double-faced watch 70 comprises first and second watch faces 72, 74 and a strap 76 connecting the faces. The watch 70 is designed to be worn so that the two faces rest on opposing sides of a wearer's wrist. Wires are embedded within the strap 76 for communication between the watch faces 72, 74.

FIG. 32 shows an enlarged view of one of the watch faces 72, 74. Each watch face contains a three-dimensional interactive display, substantially as described above. The watch shows the time and other useful information on the three-dimensional displays. The displays may operate independently or may form part of the same three-dimensional interactive display, with projectors in each watch face pointing towards a display area substantially surrounding the wearer's hand. High-resolution and multi-coloured three-dimensional effects may be produced by the watch 70, to impress the wearer's friends.

The watch is provided with a wireless communications link, for example conforming to the Wi-Fi™ standard. This allows the watch to be used to send electronic messages, including three-dimensional video messages. For sending text-based messages, an interactive keyboard may be projected by the three-dimensional interactive display.

The display housing and lightproof projector housing may be made from plastics, and in particular may be made from degradable bioplastics to reduce the environmental impact of the device at the end of its useful life.

The invention claimed is:

1. A three-dimensional display system comprising
a display housing and a plurality of projectors for simultaneously projecting two-dimensional image components into a three dimensional display volume, the three dimensional display volume comprising a particle cloud, each projector having means to adjust a distance of a projected image from the projector, and each projector being pivotally mounted to the display housing, for adjusting horizontal and vertical positions of the projected two-dimensional image component with respect to the projector, the projectors each having adjustable throw distances and projecting a two-dimensional image component or portion thereof, the two-dimensional image components combining to form an image of a three-dimensional object having at least one outer surface; and
a double-faced wristwatch comprising two watch faces and a watch strap, at least one of the watch faces including the three-dimensional display.

2. The three-dimensional display system as claimed in claim 1, in which the two-dimensional image components from the projectors combine to form a three-dimensional image, the three-dimensional object displaying a visual response to user touch.

3. The three-dimensional display system as claimed in claim 1, in which each projector is rotatable about its line of projection.

4. The three-dimensional display system as claimed in claim 1, in which each projector includes a light source, a display screen and a zoom lens.

5. The three-dimensional display system as claimed in claim 4, in which the zoom lens is a liquid zoom lens.

6. The three-dimensional display system as claimed in claim 4, in which each projector further comprises a wavefront modulator.

7. The three-dimensional display system as claimed in claim 4, in which the projector further includes a projector housing taking a shape of an elongate square prism.

8. The three-dimensional display system as claimed in claim 4, in which the projector further includes a projector housing taking a shape of a frustum of a cone, the display screen being disposed near a narrow end of the display housing and the zoom lens being disposed near a wide end.

9. The three-dimensional display system as claimed in claim 1, further comprising at least one camera and a computer provided with image-processing software.

10. The three-dimensional display system as claimed in claim 9, in which a numeral or other symbol forms part of each projected two-dimensional image, and in which the image-processing software is configured to detect scattering of the numerals or other symbols from a video signal or signals from the camera or cameras.

11. The three-dimensional display system as claimed in claim 10, in which the numerals or other symbols are projected in a part of an electromagnetic spectrum which is invisible to a human eye.

12. The three-dimensional display system as claimed in claim 11, in which the numerals or other symbols are projected in ultraviolet light.

13. The three-dimensional display system as claimed in claim 11, in which the numerals or other symbols are projected in infrared light.

14. A method of browsing the world wide web comprising the steps of:
(a) providing a three-dimensional display system comprising a display housing and a plurality of projectors for simultaneously projecting two-dimensional image components into a three dimensional display volume, the three dimensional display volume comprising a particle cloud, each projector configured to adjust a distance of a projected image from the projector, and each projector being pivotally mounted to the display housing, for adjusting horizontal and vertical positions of the projected two-dimensional image component with respect to the projector, the projectors each having adjustable throw distances and projecting a two-dimensional image component or portion thereof, the two-dimensional image components combining to form an image of a three-dimensional object having at least one outer surface;
(b) displaying a first web page on the three-dimensional display;

(c) detecting a presence and position of a user's hand or other appendage adjacent to the displayed web page; and (d) where the user's hand is detected close to a hyperlink on the first web page, reducing a size of the first web page and displaying at a larger size the web page which is a target of the hyperlink;

wherein at least one of the web pages is written in a markup language which defines a three dimensional location of each page component.

15. The method of browsing the world wide web as claimed in claim 14, in which at least one of the web pages is an HTML or XHTML web page designed for standard two-dimensional display, and in which a three-dimensional style defining the three-dimensional location of each page component is applied.

16. The three-dimensional display system as claimed in claim 10, in which the numerals or other symbols are projected in a pre-determined image component and an external object's position is determined by absence of the projected numeral or other symbol.

17. A The three-dimensional display system as claimed in claim 1, in which neighbouring two-dimensional image components are slightly separated from each other, merging together to form the image of the three-dimensional object.

18. A The three-dimensional display system as claimed in claim 1, in which the image of the three-dimensional object is built up from a foreground, a mid-ground and a background, and different portions of the foreground, mid-ground and background are visible from different angles.

* * * * *